United States Patent
McClure et al.

(10) Patent No.: US 6,233,330 B1
(45) Date of Patent: *May 15, 2001

(54) TELEPHONE CALL SCREENING DEVICE WITH POWER AND TELEPHONE LINE FAILURE ALERT, CALL ANSWERING, CALL ROUTING, AND CALLER ID

(75) Inventors: William C. McClure, Aurora; Charles E. Copeland, Northglenn; Gary S. Smock, Arvada, all of CO (US)

(73) Assignee: Command Communications, Inc., Aurora, CO (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/170,295

(22) Filed: Oct. 13, 1998

(51) Int. Cl.[7] .................................................. H04M 3/42
(52) U.S. Cl. ....................... 379/212; 379/67.1; 379/210
(58) Field of Search ............................... 379/67.1, 70, 74, 379/93.01, 88.19, 8.21, 8.24, 93.26, 102.01, 102.02, 106.09, 110.01, 142, 372, 387, 210, 211, 212, 213, 214

(56) References Cited

U.S. PATENT DOCUMENTS

| | | | |
|---|---|---|---|
| 4,496,797 | * | 1/1985 | Price ..................................... 379/412 |
| 4,582,956 | | 4/1986 | Doughty . |
| 4,731,815 | * | 3/1988 | Hanscom et al. ....................... 379/79 |
| 4,788,714 | * | 11/1988 | Hashimoto .............................. 379/74 |
| 4,813,067 | * | 3/1989 | Hashimoto ........................... 379/67.1 |
| 4,859,951 | * | 8/1989 | Cole et al. ............................. 324/534 |
| 4,876,460 | * | 10/1989 | Johnson ................................. 307/64 |
| 4,922,529 | * | 5/1990 | Kiel ....................................... 379/33 |
| 5,022,069 | * | 6/1991 | Chen .................................... 379/67.1 |
| 5,036,534 | * | 7/1991 | Gural ................................... 379/67.1 |
| 5,048,076 | * | 9/1991 | Maurer et al. ...................... 379/93.11 |
| 5,056,131 | * | 10/1991 | Kanare et al. .......................... 379/33 |
| 5,062,133 | * | 10/1991 | Melrose ............................. 379/93.11 |
| 5,063,585 | * | 11/1991 | Shapiro .................................. 379/36 |
| 5,339,354 | * | 8/1994 | Becker et al. ..................... 379/88.24 |
| 5,388,150 | * | 2/1995 | Schneyer et al. ................. 379/88.19 |
| 5,418,841 | * | 5/1995 | Haraguchi et al. ..................... 379/70 |
| 5,517,557 | * | 5/1996 | Tanaka ................................. 340/635 |
| 5,544,241 | | 8/1996 | Dibner et al. . |
| 5,550,900 | * | 8/1996 | Ensor et al. ....................... 379/88.11 |
| 5,555,289 | * | 9/1996 | Hashimoto .......................... 379/67.1 |
| 5,606,593 | * | 2/1997 | Smith ................................... 379/387 |
| 5,633,917 | * | 5/1997 | Rogers ................................... 379/74 |
| 5,663,711 | * | 9/1997 | Sanders et al. ....................... 340/635 |
| 5,684,858 | * | 11/1997 | Hartmann et al. ..................... 379/40 |
| 5,727,047 | * | 3/1998 | Bentley et al. ................... 379/93.05 |
| 5,784,441 | * | 7/1998 | Davis et al. ..................... 379/106.01 |
| 5,796,718 | * | 8/1998 | Caterisano ........................... 370/217 |
| 5,822,406 | * | 10/1998 | Brown ............................... 379/88.07 |
| 5,862,201 | * | 1/1999 | Sands .................................... 379/26 |

\* cited by examiner

*Primary Examiner*—Fan Tsang
*Assistant Examiner*—Roland G. Foster
(74) *Attorney, Agent, or Firm*—Pittenger & Smith, P.C.

(57) ABSTRACT

A telephone call screening device having an improved telephone call filtering mechanism which prevents unwanted disturbances and allows the user to designate which callers may ring the user's telephone system. The present invention also monitors a connected power source and telephone line and notifies a user if power is lost, the line is severed, or a telephone set has been left off hook. The present invention comprises a router for routing the incoming calls to one or more connected telephone sets based on codes entered by callers; a recorder; and a processor for receiving and processing the codes entered by the callers and controllably connecting the routing and recording functions and telephone sets. In the preferred embodiment, the recorder may record and play messages to incoming callers as well as record messages from the callers. A caller identification function may be included to display caller identification to the user. An emergency and a paging function alarm may also be included which may be initiated at the user's direction.

29 Claims, 3 Drawing Sheets

TELEPHONE CALL SCREENING DEVICE WITH POWER AND TELEPHONE LINE FAILURE ALERT, CALL ANSWERING, CALL ROUTING, AND CALLER ID

FIELD OF THE INVENTION

The present invention relates to a telephone call screening device that filters unwanted telephone calls while providing call answering capabilities. This invention also relates to a telephone call screening device that monitors a power source and line connection and alerts a user in the event of power loss or line failure.

BACKGROUND OF THE INVENTION

Telephone users require an increasing number of features and functions in their telephone systems. With the proliferation of home security systems, it is also desirable to protect a telephone system as well as the doors and windows in the home. Telephone lines are normally powered by an outside power source. Usually, there is no indication that the telephone line has been severed unless someone picks up a telephone set and notices there is no dial tone. Similarly, for telephone systems incorporating telephone answering devices (TAD's) or other features that require a power source, there generally is no indication that power to the unit has been lost, other than the loss of lights on the unit.

Another problem that conventional telephone systems face is a telephone set that has been left off hook. This is a common occurrence which creates a great deal of frustration for an outside caller. While the telephone operator may be contacted to verify an off hook condition, a telephone user currently has no indication other than picking up a telephone set that a telephone set in another room has been left off hook.

Another problem that telephone systems face is telephone call screening capability. A TAD is often used to screen undesirable calls such as calls from solicitors or calls received at inconvenient times. However, the screening process requires the user to listen to messages left on the TAD, and does not solve the problem where a desired call may result in a hang up the moment the caller is connected to the TAD. A telephone system that provides an improved telephone call screening capability would be very useful and is greatly needed.

PRIOR ART DISCLOSURE STATEMENT

The following information is provided in compliance with the inventor's duty to disclose all pertinent information which is relevant to the subject of this application. The listed prior art is known to the applicant and is believed to be pertinent to the examination of this application.

U.S. patent application Ser. No. 08/885,288, filed Jun. 30, 1997 by William C. McClure, et at. discloses a telephone monitoring and alarm device that informs a user of a telephone line failure or a busy line condition. However, there is no teaching of a call screening capability or the routing of incoming calls to designated telephone sets based on codes entered by the caller.

The Dibner patent (U.S. Pat. No. 5,544,241) discloses a ring detector capable of detecting a ring signal significantly faster than the time duration of a single ring signal cycle. The rapid ring detection allows incoming telephone calls having an identification tone corresponding to a telecommunication device such as a facsimile device to be routed to the device without causing an audible ring in connected telephone extensions. The present invention differs significantly from the Dibner patent in that no identification tone indicating a telecommunications device is used. In the present invention, all incoming calls are routed to a telephone answering device, unless the user enters a code that causes the telephone extension to ring. No such screening capability is contemplated by the Dibner patent.

The Doughty patent (U.S. Pat. No. 4,582,956) discloses a method and apparatus for displaying special service information at a selected state during a silent interval between ring signals. However, there is no teaching in the Doughty patent as to screening of unwanted telephone calls.

SUMMARY OF THE INVENTION

The present invention provides a telephone call screening device having an improved telephone call filtering mechanism which allows the user to designate which callers may ring the user's telephone during selected time periods while connecting other callers to a TAD. It is also a telephone interface device that can be connected between the incoming telephone line and a telephone answering device. The interface device can respectively re-route an incoming telephone call to telephones, extension telephones and telephone accessories that are also connected to the device. The present invention also monitors a connected power source and telephone line and notifies a user if power is lost, the line is severed, or a telephone set has been left off hook.

In one aspect, the present invention provides a telephone call screening device filtering incoming telephone calls, comprising a router for routing the incoming calls to one or more connected telephone sets based on codes entered by callers; call answering capabilities device and a processor for receiving and processing the codes entered by the callers and controllably connecting the routing and, call answering with the TAD functions and telephone sets. In the preferred embodiment, the TAD may record and play messages to incoming callers as well as record messages from the callers. The processor is a microprocessor that can recognize dual tone multi-frequency signals. A caller identification function may be included to display caller identification to the user. Also in the preferred embodiment, the present invention includes a telephone line monitoring function and a power source monitoring function, and notifies a user in the event that the telephone line fails or a power failure occurs. An emergency alarm may also be included that may be sounded at the user's direction.

In another aspect, the present invention provides a method for screening incoming telephone calls, comprising the steps of receiving and processing codes entered by remote callers; routing the incoming calls to one or more connected telephone sets based on the processed codes; and connecting remote callers to a TAD. Additional steps of displaying caller identification, monitoring the telephone line and power source and notifying the user if a line failure or power failure is detected, as well as sounding an alarm at the direction of a user may also be included.

Other features and advantages of the present invention will become apparent from the following detailed description of the invention when it is considered in conjunction with the accompanying drawings.

DETAILED DESCRIPTION OF THE DRAWINGS

Figure 1:
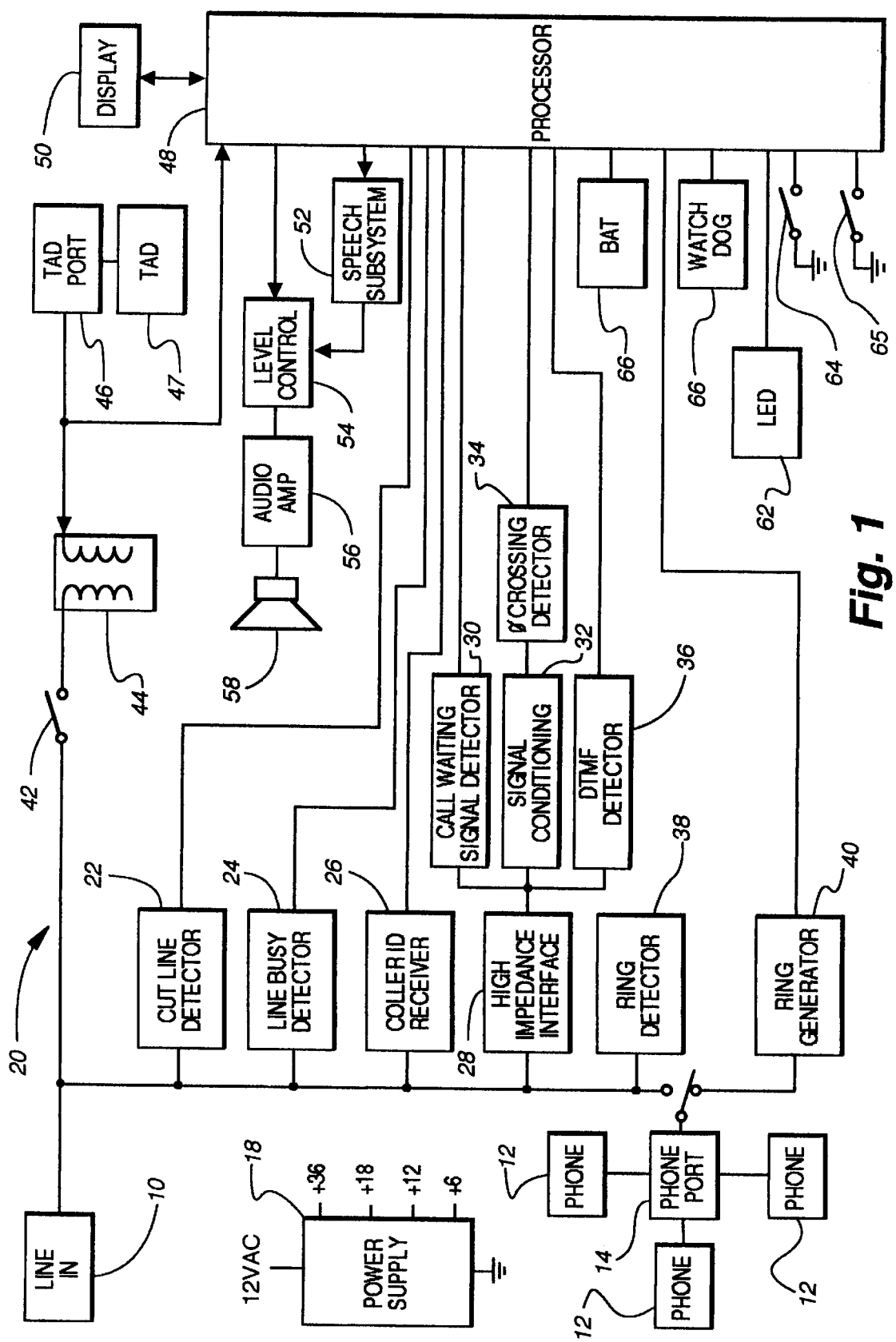
FIG. 1 is a schematic in block diagram form illustrating the components of the present invention.

Directing attention to the drawings, an embodiment of the present invention is illustrated in block diagram form in FIG. 1. A power supply 18 provides power to the switching system 20 in the required voltages. An incoming telephone line 10 is attached to a cut line detector 22, line busy detector 24, caller ID receiver 26, high impedance interface 28, and a ring detector 38. Cut line detector 22 is a voltage detector that monitors the incoming telephone line 10 for a voltage loss indicative of a severed line or other failure. Similarly, line busy detector 24 is a voltage detector that monitors the incoming line 10 for a voltage drop indicative of a telephone set being off hook. The caller ID receiver 26 monitors the incoming telephone line 10 for caller identification signals and routes them to the processor 48. The processor 48 may then inform the user of the caller identification via display 50 or an audio sounder or speaker 58. Display 50 may be a liquid crystal display or another suitable mechanism for displaying a telephone number or other text to the user. High impedance interface 28 also monitors telephone line 10 and prevents the telephone line from being loaded. It is also connected to a call waiting signal detector 30, signal conditioner 32, and a dual tone multi frequency (DTMF) detector 36. The call waiting signal detector 30 may include a 440 Hz filter and 440 Hz detector that monitor the telephone line 10 for the presence of a call waiting signal. The call waiting signal detector 30 alerts the processor 48 of the presence of a call waiting signal. The signal conditioner 32 may include an amplifier that amplifies the incoming signal as well as a high pass filter that refines the signal. The zero voltage detector 34 is connected between the signal conditioner 32 and the processor 48 and notifies the processor 48 when the input signal on the telephone line 10 has a voltage of zero volts. The DTMF detector 36 detects and decodes touch tone signals transmitted over the telephone line 10, and passes the corresponding signals to the processor 48.

In the preferred embodiment of the present invention, an Intel 8051 microprocessor is used as the processor 48, but other similar and suitable microprocessors may be used. A watch dog timer 60 monitors the operation of the processor 48 and resets it if it fails to execute or terminate a process correctly and becomes stalled. A backup battery 66 may also be attached to the processor 48 to serve as a secondary power source in the event that the power supply 18 fails.

Telephone line 10 is also attached via off hook relay 42 to the transformer 44. When energized, the off hook relay 42 connects the incoming call directly to the transformer 44. The transformer 44 adjusts the power of the signals received and connects the incoming telephone call to the telephone answering device (TAD) port 46. The TAD port 46 is connected to the TAD 47. The TAD 47 includes record and playback capabilities that provide messages from callers to the user.

The telephone port 14 may be controllably switched by the processor 48 between the incoming telephone line 10 and the ring generator 40. The ring generator 40 may be used to perform a paging function by ringing remote telephone sets 12 connected to the telephone port 14.

One or more light emitting diodes (LED) 62 may be connected to the processor 48 to provide status information of the switching system 20. A single LED may be used, displaying different colors to indicate different states of operation of the switching system 20, or individual LED's may be used for each state. Status information may also be provided by the processor 48 via an audio system that includes a level control 54, audio amplifier 56 and speaker 58. A speech subsystem 52 may be connected between the processor 48 and level control 54 to provide synthesized voice messages to inform the user of the status of the switching system 20 or provide verbal caller identification.

Figure 2:
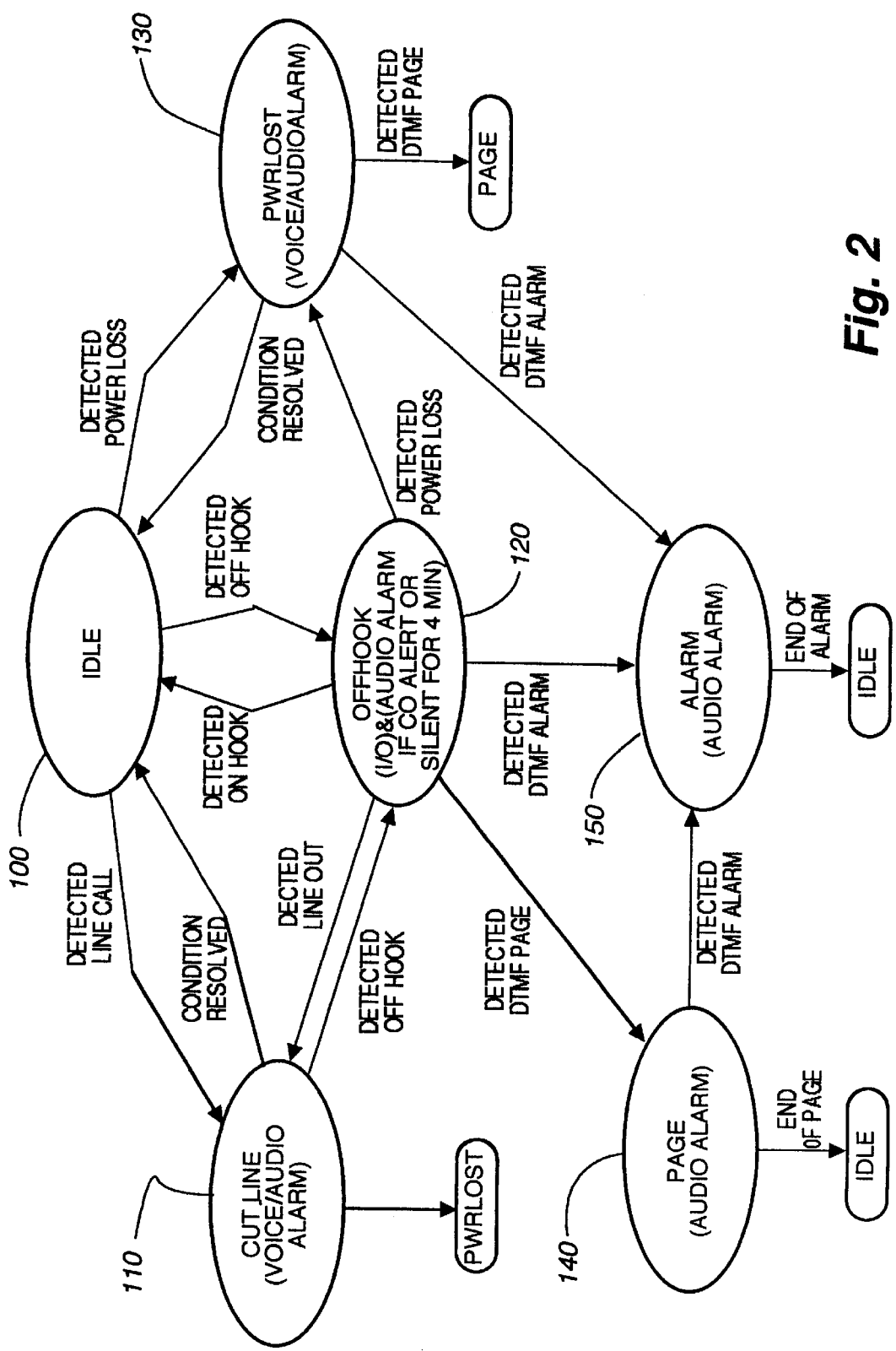
FIG. 2 is a logic diagram showing the various states of operation of the present invention with respect to line and power source monitoring functions.

FIG. 2 is a logic diagram showing the various states of operation of the present invention with respect to line and power source monitoring functions. The states of operation include the idle state 100, the cut line state 110, the off hook state 120, the power lost state 130, the page state 140, and the alarm state 150. When the switching system 20 is activated, control is passed to the idle state 100, which serves as a default state. The switching system 20 remains in the idle state 100 until the cut line detector 22 detects the loss of telephone line voltage for at least two seconds, the line busy detector 24 determines that a telephone set 12 is off hook for a predetermined time period, or a power loss is detected. If the loss of telephone line voltage is detected for a sufficient duration, control shifts to the cut line state 110. In the cut line state 110, LED 62 flashes to indicate a cut line condition. A voice alarm message, supplied by the speech subsystem 52, followed by an audio alarm, may be played over the speaker 58. Once the reset button 68 is depressed, the alarm is terminated and control returns to the idle state 100. However, while in the cut line state 110, if the processor 48 detects the failure of power source 18, control shifts from the cut line state 110 to the power lost state 130. Control may also shift from the cut line state 110 or the idle state 100 to the off hook state 120 if the line busy detector 24 detects the appropriate voltage drop when a telephone set 12 goes off hook for the required time.

Upon entering the off hook state 120, LED 62 indicates the off hook condition, and two separate off hook conditions are monitored. If there is silence on the telephone line 10 for a sufficient time period, or the central office off hook alert tone is detected, a voice message indicating the off hook condition is generated by the speech subsystem 52 and played over the speaker 58. Speaker 58 then emits an audible alarm. The user may depress the reset button 68 to silence the alarm, but the LED 62 will persist until all telephone sets 12 are on hook, at which time control will return to the idle state 100. Also in the off hook state 120, the user may enter an alarm code via the touch tone keypad on the telephone set 12 to trigger the alarm state 150. This function serves as a panic button for the user. Similarly, if the user enters a DTMF page code from the telephone set 12, control shifts from the off hook state 120 to the page state 140. This function serves to allow a user to page a different telephone set 12. Control may also shift from the off hook state 120 to the cut line state 110 if the cut line detector 22 detects the appropriate voltage loss. Similarly, control may transition from the off hook state 120 to the power lost state 130 if the processor 48 detects a failure of the power supply 18.

In the power lost state 130, the switching system 20 is powered by the backup battery 66. The LED 62 flashes and a voice alarm is played over speaker 58. The LED 62 is then reduced from a 50% duty cycle to a 5% duty cycle to conserve battery power. Upon return of AC power from the power source 18, control shifts to the idle state 100. However, the LED 62 will continue to flash until the reset button 68 is depressed. If a DTMF alarm code is detected while in the power lost state 130, control shifts to the alarm state 150. If a DTMF page code is detected while in the power lost state 130, control shifts to the page state 140.

Upon entry into the page state 140, a paging tone is played for a duration of approximately 45 seconds over the speaker 58 and the LED 62 is flashed. Once the paging tone has ceased, control shifts to the idle state 100 until the reset button 68 is depressed. If a DTMF alarm code is detected while the switching system 20 is in the page state 140, control shifts to the alarm state 150.

Upon entry into the alarm state 150, a loud siren is played over the speaker 58 for a duration of approximately four minutes while the LED 62 is flashed. During this time, if the reset button 68 is depressed or another DTMF alarm code is detected, the speaker 58 is silenced and the LED 62 is terminated, and control shifts to the idle state 100. If the reset button 68 is not depressed or a DTMF alarm code is not entered, then after the four minute interval, the speaker 58 is silenced, control shifts to the idle state 100 is entered but the LED 62 continues to flash.

Figure 3:
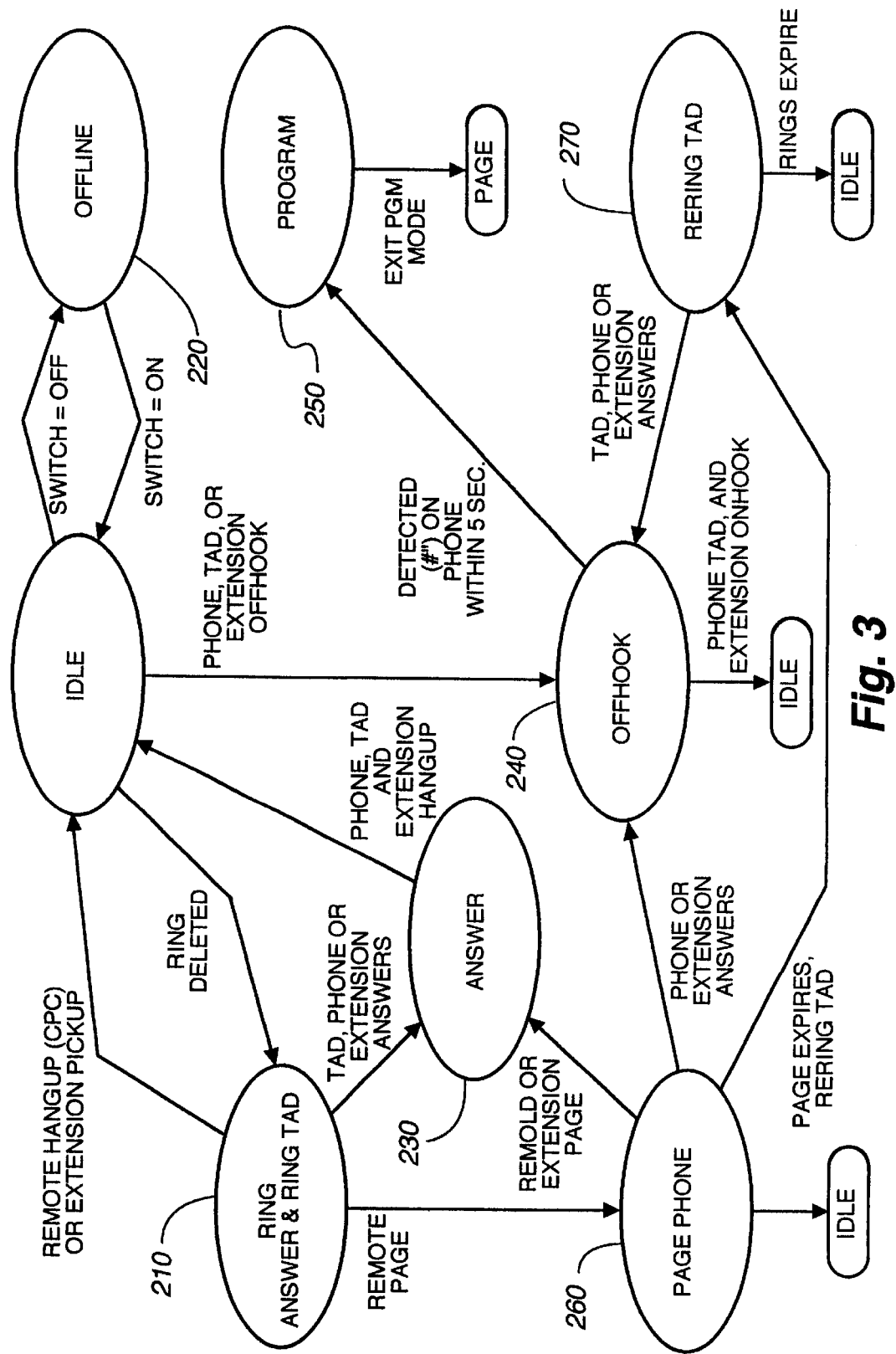
FIG. 3 is a logic diagram showing the various states of operation of the present invention with respect to the function of call filtering.

The present invention may also be used to stop inbound telephone calls from ringing other telephones tied in parallel. A user may program the switching system 20 with a numeric code. This code can be distributed to selected callers. When the caller places a telephone call to the user and enters the code from a numeric keypad, his or her call will ring through to one or more of the telephone sets 12. Without entering the code, the caller is connected to the recorder 47 and may leave a voice message. FIG. 3 is a logic diagram showing the various states of operation of the present invention with respect to the call filtering function. The call filtering function may be executed in parallel with the line and power source monitoring function described above. The call filtering function comprises eight states of operation: the idle state 200, the ring state 210, the offline state 220, the answer state 230 the off hook state 240, the program state 250, the page phone state 260, and the re-ring TAD state 270.

When the switch 64 is in the ON position, the switching system 20 is placed in the default idle state 200. Turning the switch 64 to the OFF position deactivates the filtering function and places the device 20 in the offline state 220. While in the idle state 200, if the ring detector 38 detects a ring signal on the telephone line 10, control shifts to the ring state 210. In the ring state 210, the inbound telephone call is answered and six rings to the TAD port 46 are made. If the caller hangs up, the rings to the TAD port 46 are halted and control returns to the idle state 200. If the line busy detector detects that one of the telephone sets 12 or TAD 47 is off hook, then either a telephone set 12 or TAD 47 has answered the ring, and control shifts to the answer state 230. If the caller enters a paging code while in the ring state 210, control shifts to the page phone state 260.

From the answer state 230, if the telephone set 12 or TAD 47 that is off hook is placed on hook, the inbound telephone call is terminated and control returns to the idle state 200. If a paging code is supplied by either the telephone set 12 or the caller, control shifts from the answer state 230 to the page phone state 260, and a specific telephone set 12 may be paged.

Returning to the idle state 200, if a telephone set 12 or the TAD 47 goes off hook, control shifts from the idle state 200 to the off hook state 240. The off hook state 240 may also be entered from the page phone state 260 or the re-ring TAD state 270, in each case by a telephone set 12 or the TAD 47 going off hook. When the line busy detector 24 determines that all telephone sets 12 and the TAD 47 are on hook, control returns from the off hook state 240 to the idle state 200. If a "#" key is depressed on an off hook telephone set 12 within approximately five seconds of entering the off hook state 240, the switching system 20 enters the program state 250, where the user may enter various codes to configure the switching system. Once the switching system 20 has been configured as desired, the user may enter an exit code or wait for a sufficient time interval to expire, thus exiting the program state 250 and returning to the idle state 200.

Returning to the page state 260, if a paging code for a particular telephone set 12 goes unanswered for a sufficient time interval, the paging function expires. The switching system 20 then allows the caller to leave a voice message, by entering the re-ring TAD state 270.

While an improved method and apparatus for screening incoming telephone calls with a telephone answering device has been described and illustrated in detail, it is to be understood that changes and modifications to the present invention may be achieved without departing from the spirit of the present invention.

What is claimed is:

1. A telephone interface device for screening and routing incoming calls on a telephone line, said interface device being connected between the incoming telephone line and a telephone answering device, said interface device utilizing code signals entered by callers to route incoming calls to one or more designated telephone peripherals connected to said interface device, said interface device comprising:

a) a ring signal detection means to determine when a ring signal is present on a connected telephone line indicating an incoming call;

b) a ring signal suppression means, responsive to the ring signal detection means, for suppressing the ring signal received on said connected telephone line;

c) a code detection means for receiving code signals entered by callers and initiating an output signal indicative of the code signals received;

d) a routing means responsive to said code detection output signal for routing said incoming call to selected one or more telephone peripherals connected to said interface device or default to a telephone answering device, if no output signal is initiated;

e) a ring signal generating means for activating the selected peripheral or device; and said interface device further including a processor means for operably performing the functions of the ring signal suppression means and routine means, said processor including a reset timer, operative to reset the processor if the processor fails to execute a function correctly within a predetermined time period.

2. The telephone interface device as defined in claim 1, further including a telephone answering device.

3. The telephone interface device as defined in claim 2, wherein said telephone answering device includes means for recording and playing messages to said callers.

4. The telephone ring interface device as defined in claim 2, wherein said telephone answering device includes means for recording messages from said callers.

5. The telephone interface device as defined in claim 1, wherein said code detection means includes a processing means for processing said code signals.

6. The telephone interface device as defined in claim 5, wherein said processing means includes a microprocessor.

7. The telephone interface device as defined in claim 5, wherein said processing means includes means for recognizing dual tone multifrequency code signals.

8. The telephone interface device as defined in claim 1, further including a telephone line monitoring means for detecting a telephone line failure and alerting a user to said detected telephone line failure.

9. The telephone interface device as defined in claim 1, further including a power source monitoring means for detecting a power failure and alerting a user to said detected power failure.

10. The telephone interface device as defined in claim 1, further including a caller identification means.

11. The telephone interface device as defined in claim 1, further including an alarm means for initiating an alarm at the direction of a user.

12. The telephone interface device as defined in claim 1, which further comprises a ring signal generating means.

13. The telephone interface device as defined in claim 12, wherein said ring signals are directed to and activate said telephone answering device.

14. The telephone interface device as defined in claim 12, wherein said ring signals are directed to and activate one or more of said telephone peripherals.

15. The telephone interface device as defined in claim 1, further comprising an off hook monitoring means for detecting when one or more of said telephone peripherals is off hook and unused for a predetermined length of time indicating that the telephone line is inoperable and an alarm means, said alarm means being activated by said monitoring means when said off hook unused condition is detected to indicate to a user that the telephone line is inoperable.

16. The telephone interface device as defined in claim 1, further comprising a paging means for initiating a page at the direction of a user.

17. The telephone interface device as defined in claim 1, further comprising a watchdog timer, operative to reset said telephone interface device if it becomes stalled.

18. A telephone interface device as defined in claim 1, further comprises an off hook monitoring means for detecting when there is an off hook condition and there is silence on said telephone line for a predetermined length of time indicating that the line is inoperable and an alarm means, said alarm means being activated by said monitoring means when said off hook silence duration is detected to indicate to a user that the telephone line is inoperable.

19. A method for screening incoming telephone calls on a telephone line, said method utilizing codes entered by callers to override a direct connection to a telephone answering device and route calls to one or more designated telephone peripherals, said method including the steps of:
  a) detecting a ring signal which is indicative of an incoming telephone call received on a telephone line connected to a telephone answering device;
  b) immediately suppressing said detected ring signal received on said telephone line;
  c) receiving and detecting code signals entered on said telephone line by a caller;
  d) routing and connecting said incoming call in response to the received code signals to one or more selected telephone peripherals or in the absence of the code signals to default said in-coming call to said telephone answering device; and
  e) activating the selected, peripheral or device; and
  f) performing step B and D by use of a digital processor and resetting the processor automatically if it fails to execute a process correctly within a predetermined time period.

20. A method for screening incoming telephone calls as described in claim 19, further including the step of initiating an alarm at the direction of a user.

21. A method for screening incoming telephone calls as described in claim 19, further including the steps of monitoring a telephone line and notifying a user if a line failure is detected.

22. A method for screening incoming telephone calls as described in claim 19, further including the steps of monitoring a local power source and notifying a user in the event of a local power failure.

23. A method for screening incoming calls as described in claim 19, further including the steps of identifying the origin of said incoming telephone call and displaying caller identification information to a user.

24. A method for screening incoming telephone calls as described in claim 19, wherein said step of routing includes generating a ring signal directed to the selected telephone peripheral to reactivate the peripheral or device.

25. A method for screening incoming telephone calls as described in claim 19, wherein said step of routing further comprises the step of generating ring signals directed to one or more of said telephone peripherals.

26. A method for screening incoming telephone calls as described in claim 19, further including the steps of detecting when one or more of said telephone peripherals is off hook, or if there is silence on said telephone line during a telephone call, for a predetermined length of time, and alerting a user to such off hook status.

27. A method for screening incoming telephone calls as described in claim 19, further including the step of initiating a page at the direction of a user.

28. A telephone interface device for screening and routing incoming telephone calls on a connected telephone line, said interface device being connected between the incoming telephone line and a telephone answering device, said interface device utilizing code signals entered by callers to route incoming calls to one or more designated telephone peripherals connected to said interface device, said interface device comprising:
  a) a ring signal detection means to determine when a ring signal is present on a connected telephone line indicating an incoming call;
  b) a ring signal suppression means, responsive to the ring signal detection means, for suppressing the ring signal received on said connected telephone line;
  c) a code detection means for receiving code signals entered by callers and initiating an output signal indicative of the code signals received;
  d) a routing means responsive to said code detection output signal for routing said incoming call to selected one or more telephone peripherals connected to said interface device or default to said telephone answering device, if no output signal is initiated;
  e) a ring signal generating means for activating the selected peripheral or device;
  f) an off hook monitoring means for detecting when one or more of said telephone peripherals is off hook and unused for a predetermined length of time indicating that the line is inoperable and an alarm means, said alarm means being activated when said off hook condition is detected to indicate to a user that the telephone line is inoperable; and
  g) said interface device further comprising a processor for performing the functions of said ring signal suppression means and said routing means, said processor means further including a reset timing device operative to reset the processor if the processor fails to execute a function correctly during a predetermined time period.

29. A telephone interface device in combination with a telephone answering device for screening and routing incoming telephone calls on a connected telephone line, said interface device being connected between the incoming telephone line and the telephone answering device, said interface device utilizing code signals entered by callers to route incoming calls to one or more designated telephone peripherals connected to said interface device, said interface device combination comprising:

a) a telephone answering device capable of transmitting prerecorded messages and recording messages from a caller;

b) a ring signal detection means, to determine when a ring signal is present on said connected telephone line, indicating an incoming call;

c) a ring signal suppression means, responsive to the ring signal detection means, for suppressing the ring signal received on said connected telephone line;

d) a code detection means for receiving code signals entered by callers and initiating an output signal indicative of the code signals received;

e) a routing means responsive to said code detection output signal for routing said incoming call to selected one or more telephone peripherals connected to said interface device or default to the telephone answering device, if no output signal is initiated;

f) a ring signal generating means for activating the selected peripheral or device; and g) said telephone interface combination device further including a processor means for performing the functions of said ring signal suppression mean and said routing means, said processor means further including a reset timer means operative to reset the processor if the processor fails to execute a function correctly within a predetermined time period.

* * * * *